(12) United States Patent
Su

(10) Patent No.: US 8,267,360 B2
(45) Date of Patent: Sep. 18, 2012

(54) HEIGHT ADJUSTABLE HOLDING APPARATUS

(75) Inventor: Yung-Chun Su, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 88 days.

(21) Appl. No.: 12/399,098

(22) Filed: Mar. 6, 2009

(65) Prior Publication Data

US 2009/0230261 A1   Sep. 17, 2009

(30) Foreign Application Priority Data

Mar. 11, 2008 (TW) ................................ 97108446 A

(51) Int. Cl.
*F16M 13/00* (2006.01)

(52) U.S. Cl. ............ 248/123.11; 248/125.2; 248/162.1; 61/679.22

(58) Field of Classification Search .............. 248/123.11, 248/125.2, 162.1, 404, 157; 361/679.22
See application file for complete search history.

(56) References Cited

U.S. PATENT DOCUMENTS

| | | | | |
|---|---|---|---|---|
| 3,575,368 A * | 4/1971 | Thomas et al. | ................. | 248/572 |
| 4,067,527 A * | 1/1978 | Streit | ................. | 248/123.2 |
| 4,685,648 A * | 8/1987 | Dobner et al. | ................. | 248/572 |
| 5,253,832 A * | 10/1993 | Bolas et al. | ................. | 248/123.11 |
| 6,918,564 B2 * | 7/2005 | Yen et al. | ................. | 248/404 |
| 7,621,490 B2 * | 11/2009 | Tseng | ................. | 248/157 |
| 7,628,371 B2 * | 12/2009 | Gan et al. | ................. | 248/422 |
| 7,631,841 B1 * | 12/2009 | Yen et al. | ................. | 248/121 |
| 7,637,463 B2 * | 12/2009 | Yen et al. | ................. | 248/157 |
| 2004/0250635 A1 * | 12/2004 | Sweere et al. | ................. | 74/1 R |
| 2005/0034547 A1 * | 2/2005 | Sweere et al. | ................. | 74/1 R |
| 2006/0118680 A1 * | 6/2006 | Yen | ................. | 248/121 |
| 2006/0185563 A1 * | 8/2006 | Sweere et al. | ................. | 108/28 |
| 2008/0026892 A1 * | 1/2008 | Asamarai et al. | ................. | 474/84 |
| 2008/0099637 A1 * | 5/2008 | Pai | ................. | 248/157 |
| 2009/0166482 A1 * | 7/2009 | Gan et al. | ................. | 248/122.1 |
| 2009/0173845 A1 * | 7/2009 | Wang et al. | ................. | 248/121 |
| 2009/0206212 A1 * | 8/2009 | Yen et al. | ................. | 248/162.1 |

FOREIGN PATENT DOCUMENTS

JP        2003097095        4/2003

\* cited by examiner

*Primary Examiner* — Bradley Duckworth

(57) ABSTRACT

A height adjustable holding apparatus for holding an object is provided. The height adjustable holding apparatus includes a support, a moving part, a holding unit, an elastic member, and a linking unit. The moving part is movable along the support, wherein the object connects to the moving part to be movable along the support. The holding unit is disposed at a top end of the support. The elastic member is disposed at a bottom end of the support. One end of the linking unit connects to the moving part and the other end extending around the holding unit to connect to the elastic member. When moving the object along the support to a desired position, the object substantially remains balanced at the desired position by the cooperation of the holding unit, the elastic member and the linking unit.

15 Claims, 5 Drawing Sheets

HEIGHT ADJUSTABLE HOLDING APPARATUS

BACKGROUND OF THE INVENTION

1. Field of the Invention

This invention generally relates to a height adjustable holding apparatus. More particularly, this invention relates to a height adjustable holding apparatus for holding a display.

2. Description of the Prior Art

Display apparatuses are widely used in modern life. In addition to being a necessary equipment for receiving image from a computer, the display apparatus can be used for receiving and displaying television programs, family video games, and multimedia information.

Human eyes receive video images output from the display apparatus. In order to have the greatest displaying effect and to avoid the discomfort and loss of eyesight caused by users lifting up and down their heads for a long period of time, the height of the display is preferably adjustable. Moreover, the height of the display is preferably easily adjustable since the user frequently changes the position and the elevation angle of his/her head.

Currently, adjusting the height of a display is usually adopted a support having a constant force spring. Because a tensile force of the constant force spring remains constant regardless of the extending length of the spring, the constant force spring provides a constant tensile force to the display regardless of the height of the display. Hence, the display can remain balanced at a desired position after adjusting the height of the display. Conventionally, the thickness of the support is relatively thick because the constant force spring is disposed in the middle part of the support. Therefore, the height adjustable holding apparatus for holding a display is still improvable.

SUMMARY OF THE INVENTION

It is an object of the present invention to provide a height adjustable holding apparatus for holding an object.

It is another object of the present invention to provide a height adjustable holding apparatus having a thinner exterior.

In one embodiment, a height adjustable holding apparatus includes a support, a moving part, a holding unit, an elastic member, and a linking unit. The moving part is movable along the support, wherein the object connects to the moving part to be movable along the support. The holding unit is disposed at the top end of the support. The elastic member is disposed at the bottom end of the support. One end of the linking unit connects to the moving part and the other end extends around the holding unit to connect to the elastic member. When moving the object along the support to a desired position, the object substantially remains balance balanced at the desired position by the cooperation of the holding unit, the elastic member and the linking unit.

The end of the elastic member connected to the linking unit moves along a second direction when the object moves along a first direction, wherein the first direction is opposite to the second direction. The object may include a display. The elastic member includes a constant force spring. The bottom end of the support further includes a support accommodation portion for accommodating the elastic member. The height adjustable apparatus further includes a base connected to the bottom end of the support. The base further includes a base accommodation portion for accommodating the elastic member.

The holding unit may include a roller. The roller is transversely fixed at the top end of the support. Alternatively, the holding unit may include a pulley. The linking unit may include a chain, a rope, or a steel wire covered with plastic. The height adjustable holding apparatus may further include a stopper disposed on the support for restricting the movement of the moving part.

DETAILED DESCRIPTION OF THE PREFERRED EMBODIMENT

The present invention provides a height adjustable holding apparatus for holding an object. In a preferred embodiment shown in FIG. 1, the object 400 is a display of a display apparatus 600, wherein the height adjustable device 800 is a holder for holding the display. In other embodiments, however, the height adjustable holding apparatus 800 can be a holder for holding other objects, such as a television or any object in need of height adjustable support.

Figure 1:
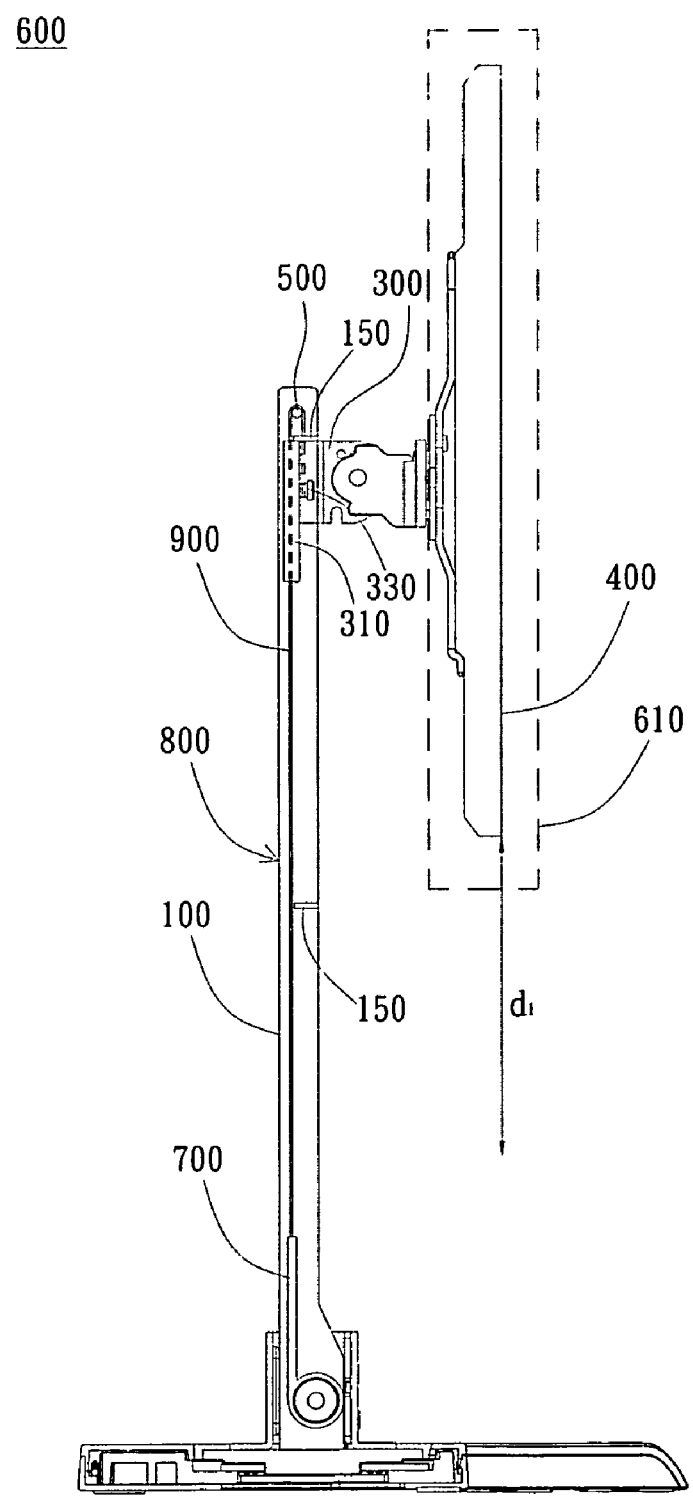
FIG. 1 is a schematic side view of an object located in a first location in accordance with a preferred embodiment of a display apparatus of the present invention.

As shown in FIG. 1, the height adjustable holding apparatus 800 includes a support 100, a moving part 300, a holding unit 500, an elastic member 700, and a linking unit 900. The moving part 300 is disposed to be movable along the support 100 and provided to connect the object 400, so that the object 400 can be movable along the support 100.

Figure 2:
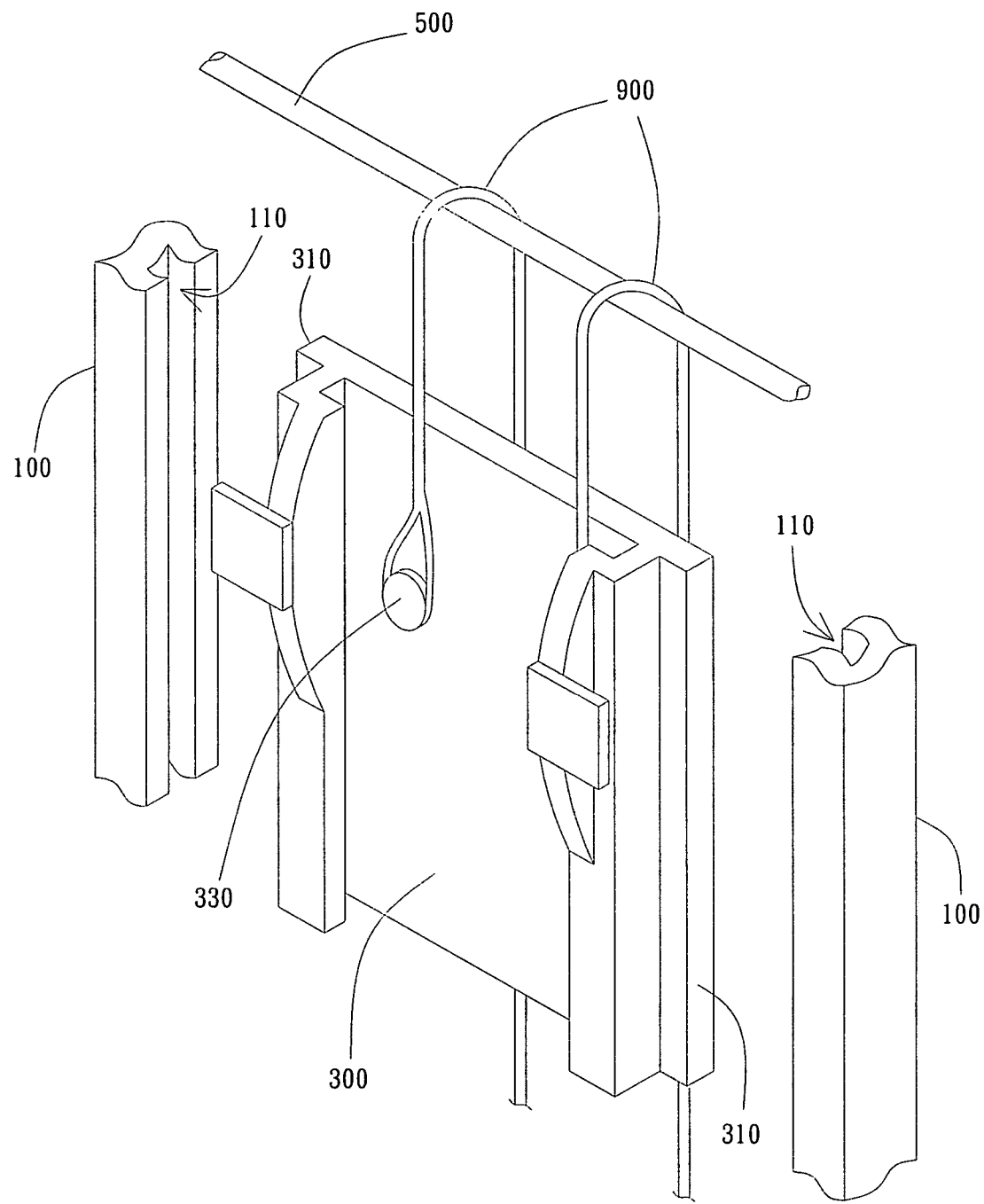
FIG. 2 is a perspective view of a support, a moving part, a holding unit, an elastic member, and a linking unit in accordance with a preferred embodiment of the present invention.

More particularly, the support 100 may include a guiding unit disposed along a side of the support 100 for guiding the moving part 300 as well as the object 400 to be movable along the support 100. The guiding unit can be a rail, a groove, or a shaft and can be provided in singular or plural form. As shown in FIG. 2, two coupling portions 310 are disposed on two sides of the moving part 300. The coupling portions 310 are respectively inserted into two grooves 110 on two inner sides of the support 100. As the coupling portions 310 couple with the grooves 110 respectively, the moving part 300 is restricted to move along the support 100.

As shown in FIG. 1, the holding unit 500 is disposed at a top end of the support 100, but not limited to. For example, as shown in FIG. 2, the holding unit 500 is a roller transversely fixed at the top end of the support 100. The holding unit 500 is provided to allow the linking unit 900 to extend around the holding unit 500 so that the heading direction of the linking unit 900 is changed. Alternatively, in other embodiments, the holding unit 500 can be any other suitable device for changing the heading direction of the linking unit 900, for example a pulley.

The elastic member 700 is disposed at a bottom end of the support 100. One end of the linking unit 900 connects to the moving part 300 and the other end extends around the holding unit 500 to connect to the elastic member 700. As shown in FIG. 2, a pair of linking units 900, but not limited to, are disposed to share the loading and to increase the total loading capacity. The linking unit 900 can be a chain, a rope, or any other suitable belt-like mechanism capable of linking the moving part 300 and the elastic member 700. The linking unit 900 is preferable that a steel wire covered with plastic, but not limited to, to decrease the friction damage on the holding unit 500 when the object 400 is moving. As shown in FIG. 2, the linking unit 900 is fixed onto the moving part 300 through a fixing part 330 on the surface of the moving part 300. In another embodiment, the linking unit 900 can be directly tied to a through hole of the moving part 300 or connected to the moving part 300 by welding, adhering, or clamping, etc.

The operation of the height adjustable holding apparatus 800 of the present invention will be described as follows. When a user applies an external force to move the object 400 over a first distance $d_1$ along and relative to the support 100 from a first position 610 shown in FIG. 1 to a second position 620 shown in FIG. 3, the moving part 300 moves together with the object 400 over the first distance $d_1$ and the end of the linking unit 900 connected to the moving part 300 is pulled down over the first distance $d_1$. Since the other end of the linking unit 900 extends around the holding unit 500 to connect to the elastic member 700, the end of the linking unit 900 connected to the elastic member 700 moves upward and pulls the elastic member 700 to extend over the first distance $d_1$. In other words, the end of the elastic member 700 connected to the linking unit 900 moves along a second direction when the object 400 moves along a first direction, wherein the first direction is opposite to the second direction. In a preferred embodiment shown in FIG. 1 and FIG. 3, the first direction and the second direction are downward and upward respectively.

As shown in FIG. 1, the elastic member 700 is a constant force spring, wherein the tensile force of the elastic member 700 applying on the linking unit 900 substantially remains constant after being pulled over the first distance $d_1$. In other words, the tensile force of the elastic member 700 applying on the linking unit 900 will not substantially be changed while the movement of the object 400. Therefore, when moving the object 400 along the support 100 to a desired position, the object 400 substantially remains balanced at the desired position by the cooperation of the holding unit 500, the elastic member 700 and the linking unit 900. The constant force elastic member 700 requires a space to accommodate and is disposed at the bottom end of the support 100. The holding unit 500, the linking unit 900, and the coupling portion 310 of the moving part 300 disposed in the support 100, which are occupied relatively less space than the constant force elastic member 700 mentioned above. Therefore, the thickness of the support 100 can be reduced so that the height adjustable holding apparatus 800 having a thinner exterior is provided.

Figure 4:
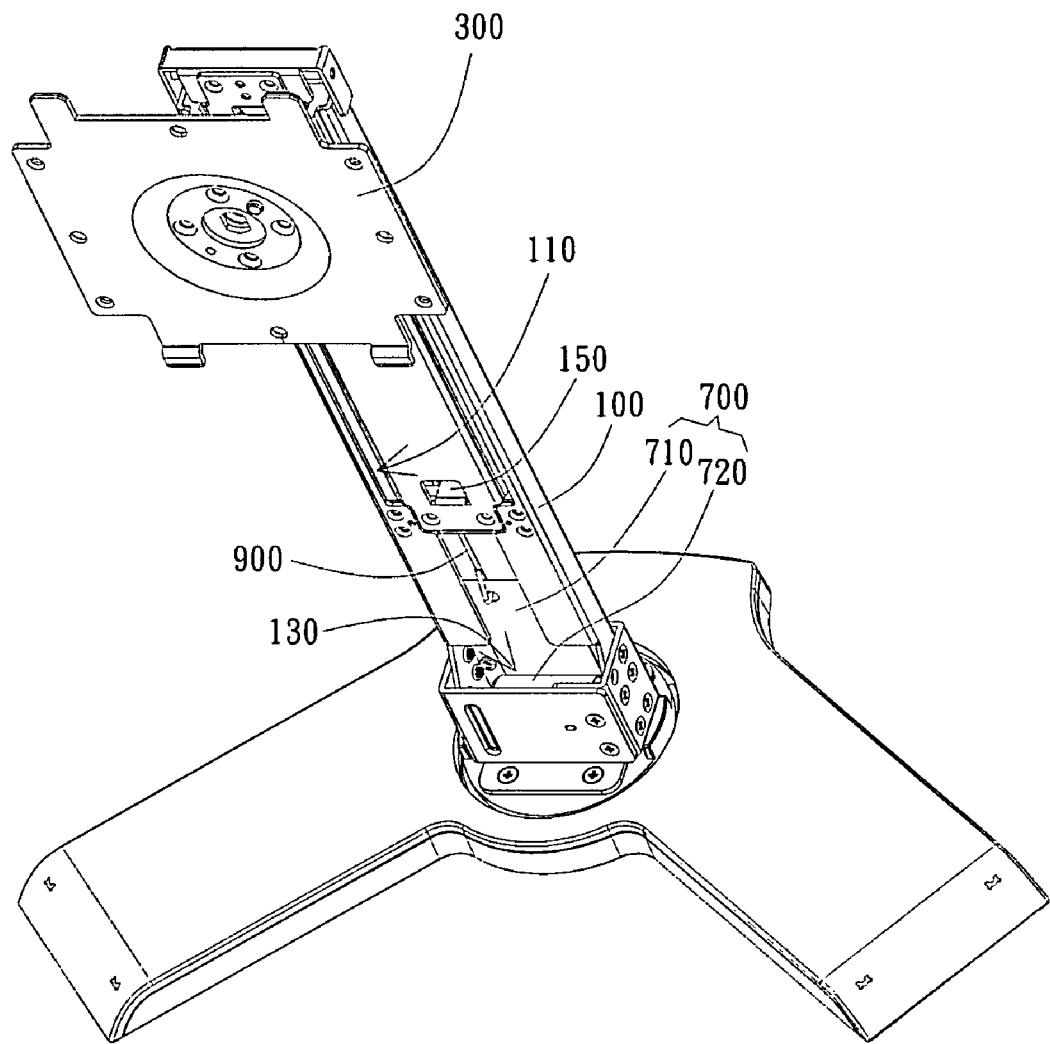
FIG. 4 is a schematic side view of a height adjustable apparatus in accordance with a preferred embodiment of the present invention.

In a preferred embodiment shown in FIG. 4, the bottom end of the support 100 further includes a support accommodation portion 130 for accommodating the constant force spring, which serves as the elastic member 700. In other words, only an unrolled plate part 710 of the constant force spring extends out the support accommodation portion 130, and a rolled ribbon part 720 which are disposed in the support accommodation portion 130. Therefore, the thickness of the support 100 at a position above the elastic member 700 can be reduced.

Figure 5:
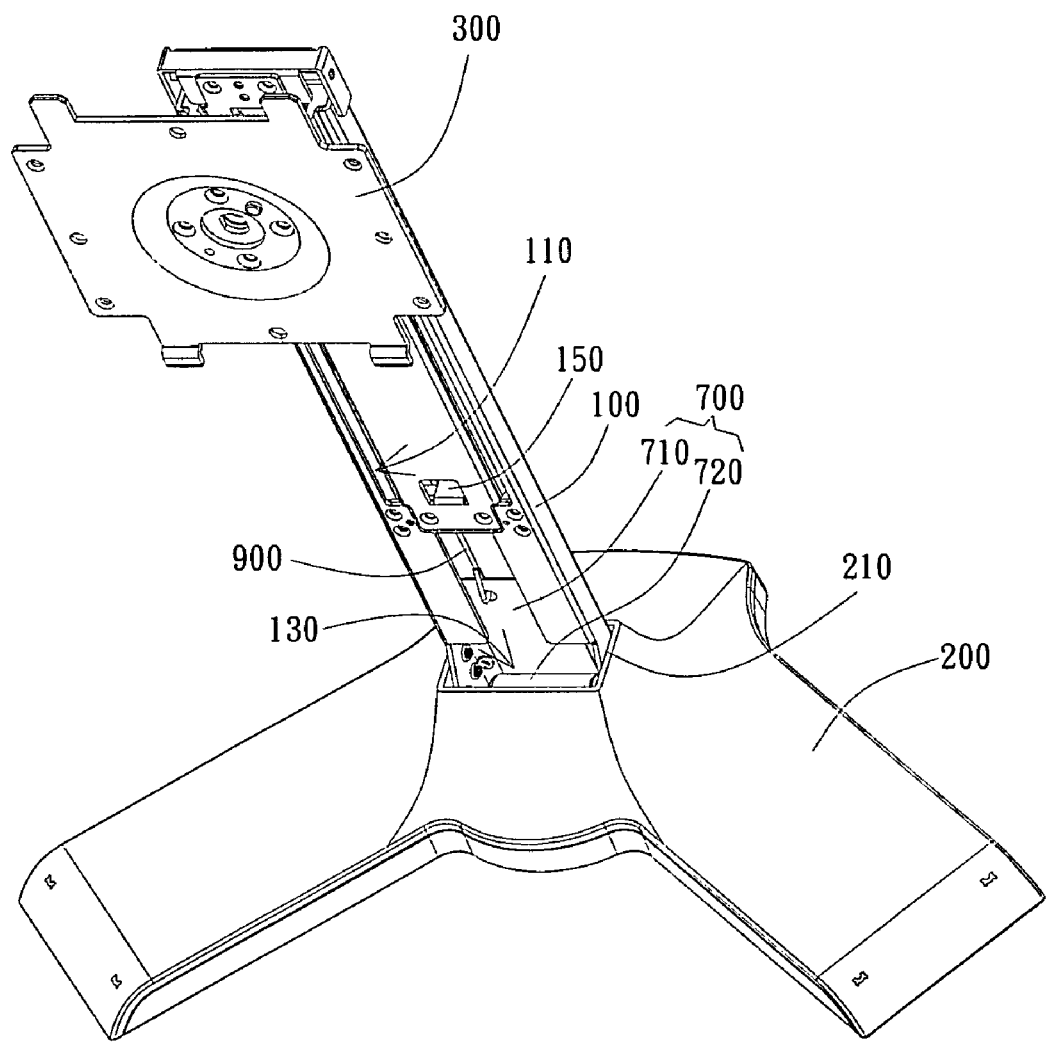
FIG. 5 is a schematic side view of a height adjustable apparatus in accordance with another embodiment of the present invention.

In another embodiment shown in FIG. 5, the height adjustable holding apparatus 800 of the present invention further includes a base 200 connected to the bottom end of the support 100. More particularly, in this embodiment, the support 100 is inserted into the base 200 and fixed onto the base 200. The base 200 further includes a base accommodation portion 210 for accommodating the elastic member 700, i.e. the constant force spring.

Figure 3:
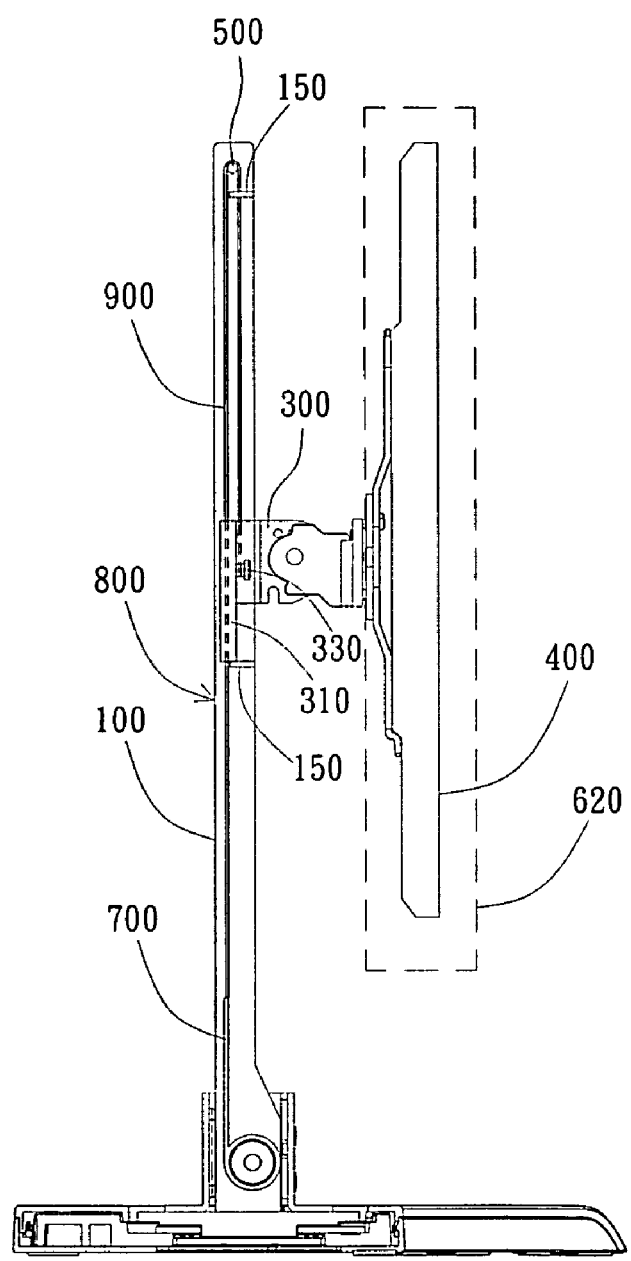
FIG. 3 is a schematic side view of an object located in a second location in accordance with a preferred embodiment of a display apparatus of the present invention.

In the preferred embodiments shown in FIG. 1 and FIG. 3, the height adjustable holding apparatus 800 of the present invention further includes a stopper 150 disposed on the support 100 for restricting the movement of the moving part 300. The stopper 150 can be disposed between the moving part 300 and the top end of the support 100 to restrict the movement of the moving part 300 toward the stopper 150. When the moving part 300 moves toward the holding unit 500, the stopper 150 blocks the moving part 300 from further moving. Because the weight of the moving part 300 and the weight of the object 400 are supported by the upward tensile force of the linking unit 900, the stopper 150 can prevent the moving part 300 from exceeding the top edge of the holding unit 500 to change the direction of the tensile force of the linking unit 900 and accordingly prevent the moving part 300 and the object 400 from losing the supporting tensile force.

Furthermore, the stopper 150 can be disposed between the moving part 300 and the bottom end of the support 100 for restricting the movement of the moving part 300 toward the bottom end of the support 100. In a preferred embodiment shown in FIG. 3, the movement of the moving part 300 is restricted by the stopper 150 when the moving part 300 moves toward the bottom end of the support 100 to the position corresponding to the stopper 150. Since the extending length of the elastic member 700, i.e. the constant force spring, is limited, the stopper 150 can be used to prevent the constant force spring from being pulled over its extending length limit by the linking unit 900. Moreover, in another embodiment, the movement of the moving part 300 is restricted by the stopper 150 to avoid the object 400 bumping against the ground or the bottom of the support 100.

Moreover, the stopper and the support are integrally formed into a single piece. As shown in FIG. 4, the stopper 150 is made by punching the support 100. In other words, in a preferred embodiment, the stopper is in a plate form made by directly punching the housing of the support 100. In other embodiments, however, the stopper 150 can be in different forms, such as pillar or protrusion.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A height adjustable holding apparatus for holding an object, comprising:
   a support;
   a holding unit fixedly disposed at a top end of the support;
   a support accommodation portion disposed at a bottom end of the support, wherein the support accommodation portion contains a shaft;
   a moving part being movable along and within the length of the support, wherein the object connects to the moving part to be movable along the support;
   an elastic member disposed at the bottom end of the support, wherein the elastic member is a constant force spring having a rolled ribbon part and an unrolled plate part, wherein the rolled ribbon part connects to the unrolled plate part, wherein the rolled ribbon part is disposed in the support accommodation portion and rotatably wraps around and connects to the shaft; and a linking unit having one end connecting to the moving part and the other end extending around the holding unit to connect to the elastic member;

wherein when moving the object along the support to a desired position, the unrolled plate part of the elastic member extends from the support accommodation portion into the middle portion of the support, the object substantially remains balanced at the desired position by the cooperation of the holding unit, the elastic member and the linking unit;

wherein the support has a front side facing the object and a rear side opposite to the front side, wherein a cross section from the front side to the back side is defined, wherein the width of the support accommodation portion in the cross section is greater than the width of the support in the cross section, wherein the width of the rolled ribbon part in the cross section is greater than the width of the unrolled plate part in the cross section.

2. The height adjustable holding apparatus of claim 1, wherein the end of the elastic member connected to the linking unit moves along a second direction when the object moves along a first direction, the first direction is opposite to the second direction.

3. The height adjustable holding apparatus of claim 1, further comprising a base connected to the bottom end of the support, wherein the base further includes a base accommodation portion for accommodating the elastic member.

4. The height adjustable holding apparatus of claim 1, wherein the object comprises a display.

5. The height adjustable holding apparatus of claim 1, further comprising a stopper disposed between the moving part and the top end of the support for restricting the movement of the moving part.

6. A display apparatus, comprising:
a display;
a support;
a holding unit fixedly disposed at a top end of the support;
a support accommodation portion disposed at a bottom end of the support, wherein the support accommodation portion contains a shaft;
a moving part being movable along the support, wherein the display connects to the moving part to be movable along the support;
an elastic member disposed at the bottom end of the support, wherein the elastic member is a constant force spring having a rolled ribbon part and an unrolled plate part, wherein the rolled ribbon part connects to the unrolled plate part, wherein the rolled ribbon part is disposed in the support accommodation portion and rotatably wraps around and connects to the shaft; and a linking unit having one end connecting to the moving part and the other end extending around the holding unit to connect to the elastic member;

wherein when moving the object along the support to a desired position, the unrolled plate part of the elastic member extends from the support accommodation portion into the middle portion of the support, the object substantially remains balanced at the desired position by the cooperation of the holding unit, the elastic member and the linking unit;

wherein the support has a front side facing the object and a rear side opposite to the front side, wherein a cross section from the front side to the back side is defined, wherein the width of the support accommodation portion in the cross section is greater than the width of the support in the cross section, wherein the width of the rolled ribbon part in the cross section is greater than the width of the unrolled plate part in the cross section.

7. The display apparatus of claim 6, wherein the end of the elastic member connected to the linking unit moves along a second direction when the object moves along a first direction, the first direction is opposite to the second direction.

8. The display apparatus of claim 6, further comprising a base connected to the bottom end of the support, wherein the base further includes a base accommodation portion for accommodating the elastic member.

9. The display apparatus of claim 6, wherein the holding unit comprises a roller or a pulley.

10. The display apparatus of claim 9, wherein the roller is transversely fixed at the top end of the support.

11. The display apparatus of claim 6, further comprising a stopper between the moving part and the top end of the support for restricting the movement of the moving part.

12. The display apparatus of claim 1, wherein the moving part is movable along and within the support and below the holding unit.

13. The display apparatus of claim 6, wherein the moving part is movable along and within the support and below the holding unit.

14. The height adjustable holding apparatus of claim 1, wherein the support stands on a working surface, wherein the shaft extends along a direction parallel to the working surface.

15. The height adjustable holding apparatus of claim 6, wherein the support stands on a working surface, wherein the shaft extends along a direction parallel to the working surface.

* * * * *